(12) United States Patent
Yeung et al.

(10) Patent No.: US 11,101,712 B2
(45) Date of Patent: Aug. 24, 2021

(54) MOTOR, END CAP AND MANUFACTURING METHOD THEREOF

(71) Applicant: Johnson Electric International AG, Murten (CH)

(72) Inventors: Yukwai Yeung, Hong Kong (CN); Chingsik Lau, Hong Kong (CN); Dawei Zhou, Hong Kong (CN); Siukin Tam, Hong Kong (CN); Tao Fu, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 513 days.

(21) Appl. No.: 16/032,965

(22) Filed: Jul. 11, 2018

(65) Prior Publication Data

US 2019/0020240 A1 Jan. 17, 2019

(30) Foreign Application Priority Data

Jul. 11, 2017 (CN) .................. 2017 1056 3187.X (51) Int. Cl.
| | |
|---|---|
| *H02K 5/08* | (2006.01) |
| *H02K 5/14* | (2006.01) |
| *H02K 11/40* | (2016.01) |
| *H02K 23/66* | (2006.01) |
| *H02K 15/14* | (2006.01) |
| *H02K 5/22* | (2006.01) |
| *H02K 11/026* | (2016.01) |
| *H01R 39/38* | (2006.01) |

(52) U.S. Cl.
CPC .............. *H02K 5/08* (2013.01); *H01R 39/38* (2013.01); *H02K 5/146* (2013.01); *H02K 5/148* (2013.01); *H02K 5/225* (2013.01); *H02K 11/026* (2013.01); *H02K 11/40* (2016.01); *H02K 15/14* (2013.01); *H02K 23/66* (2013.01); *H02K 5/14* (2013.01)

(58) Field of Classification Search
CPC .................................. H02K 5/08; H02K 5/14
USPC .................... 310/68 R, 71, 89, 239
See application file for complete search history.

(56) References Cited

U.S. PATENT DOCUMENTS

| | | | | |
|---|---|---|---|---|
| 5,939,807 | A * | 8/1999 | Patyk | ...................... H02K 5/161 |
| | | | | 310/64 |
| 6,078,117 | A * | 6/2000 | Perrin | .................. H01R 13/719 |
| | | | | 310/68 R |

(Continued)

FOREIGN PATENT DOCUMENTS

| | | |
|---|---|---|
| EP | 2104204 A1 | 9/2009 |
| WO | 2017110420 A1 | 6/2017 |

OTHER PUBLICATIONS

European Search Report dated Nov. 8, 2018.
EP Communication from the Examining Division for EP-18182871, dated Nov. 30, 2020.

*Primary Examiner* — Gary A Nash
(74) *Attorney, Agent, or Firm* — Millman IP Inc.

(57) ABSTRACT

An electric motor, an end cap thereof and a manufacturing method of the end cap are provided. The end cap includes an insulating body and a filter circuit board mounted to the insulating body. The filter circuit board includes at least two power conductors for receiving an external power source, an insulating support frame integral with the at least two power conductors, and at least one filter element. One end of the at least one filter element is connected to a corresponding power conductor, and the other end of the at least one filter element is grounded.

16 Claims, 11 Drawing Sheets

(56) References Cited

U.S. PATENT DOCUMENTS

| | | | |
|---|---|---|---|
| 2002/0047471 A1* | 4/2002 | Sik Lau | H02K 11/40 310/239 |
| 2012/0175980 A1* | 7/2012 | Zhang | H02K 5/145 310/71 |
| 2013/0307380 A1* | 11/2013 | Zeng | H02K 11/05 310/68 R |
| 2014/0049126 A1* | 2/2014 | Jiang | H02K 11/026 310/72 |
| 2015/0372560 A1* | 12/2015 | Liang | H02K 13/006 310/71 |
| 2015/0372569 A1* | 12/2015 | Lau | H02K 11/026 310/71 |
| 2015/0381019 A1* | 12/2015 | Qin | H02K 13/006 310/72 |
| 2016/0043618 A1* | 2/2016 | Lai | H02K 11/026 310/72 |
| 2016/0190900 A1 | 6/2016 | Kremer et al. | |
| 2016/0285340 A1 | 9/2016 | Hiwa et al. | |
| 2019/0006918 A1 | 1/2019 | Kuniya | |

* cited by examiner

MOTOR, END CAP AND MANUFACTURING METHOD THEREOF

CROSS REFERENCE TO RELATED APPLICATIONS

This non-provisional patent application claims priority under 35 U.S.C. § 119(a) from Patent Application No. 201710563187.X filed in The People's Republic of China on Jul. 11, 2017.

FIELD OF THE DISCLOSURE

This present disclosure relates to an electric motor, an end cap thereof and a manufacturing method of the end cap.

BACKGROUND OF THE DISCLOSURE

The end caps of current electric motors are substantially cylindrical, mounted with power terminals and filter elements, such as capacitors, inductors, and resistors. Typically, the end cap has a plurality of mounting grooves and holes for mounting the filter elements and the pins thereof. When mounting the filter elements, it is necessary to manually bend the pins of the filter element into corresponding shapes to pass through the corresponding mounting holes, and then place the filter elements in the corresponding mounting grooves. The pins of the filter elements are manually soldered to the power terminals. As such, the mounting process of the end cap is complicated, not convenient for automatic assembly, and thus has a high cost.

SUMMARY

Thus, there is a desire for an end cap with simple structure and low cost, an electric motor utilizing the end cap, and a manufacturing method of the end cap.

According to one aspect, an end cap of an electric motor is provided which includes an insulating body and a filter circuit board mounted to the insulating body. The filter circuit board includes at least two power conductors for receiving an external power source, an insulating support frame integral with the at least two power conductors, and at least one filter element. One end of the at least one filter element is connected to a corresponding power conductor, the other end of the at least one filter element is grounded.

According to another aspect, an electric motor is provided, which includes a rotor and a stator. The stator includes a filter circuit board mounted into the electric motor. The filter circuit board includes at least two power conductors for receiving an external power source, an insulating support frame integral with the at least two power conductors, and at least one filter element. One end of the at least one filter element being connected to a corresponding power conductor, the other end of the at least one filter element being grounded.

According to still another aspect, a manufacturing method of an end cap of an electric motor is provided, which includes preparing a filter circuit board and mounting the filter circuit board to an insulating body. The step of preparing a filter circuit board includes forming two power conductors for receiving an external power source; molding an insulating support frame on the conductors; and connecting at least one filter element to a corresponding power conductor.

In some embodiments of the present disclosure, the end cap has a filter circuit board which is directly mounted to the end cap or inside the motor. The filter circuit board includes an integrally formed insulating support frame and conductors, and at least one filter element connected to a corresponding conductor. The mounting process of the end cap is simple, convenient for automatic assembly, and thus has a low cost.

BRIEF DESCRIPTION OF THE DRAWINGS

A preferred embodiment of the disclosure will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

The subject matter will be described in conjunction with the accompanying drawings and the preferred embodiments. The described embodiments are only a few and not all of the embodiments of the present disclosure. All other embodiments obtained by those ordinarily skilled in the art based on the embodiments of the present disclosure without any creative efforts fall within the protection scope of the present disclosure. It is to be understood that, the drawings are provided for reference only and are not intended to be limiting of the invention. The dimensions shown in the drawings are only for convenience of illustration and are not intended to be limiting.

It should be noted that when a component is considered to be "connected" to another component, it can be directly connected to another component or may also have a centered component. Unless otherwise defined, all technical and scientific terms used herein have the same meaning as commonly understood by those ordinarily skilled in the art.

The terminology used in the specification of the present disclosure is only for the purpose of describing particular embodiments and is not intended to limit the invention.

Figure 1:
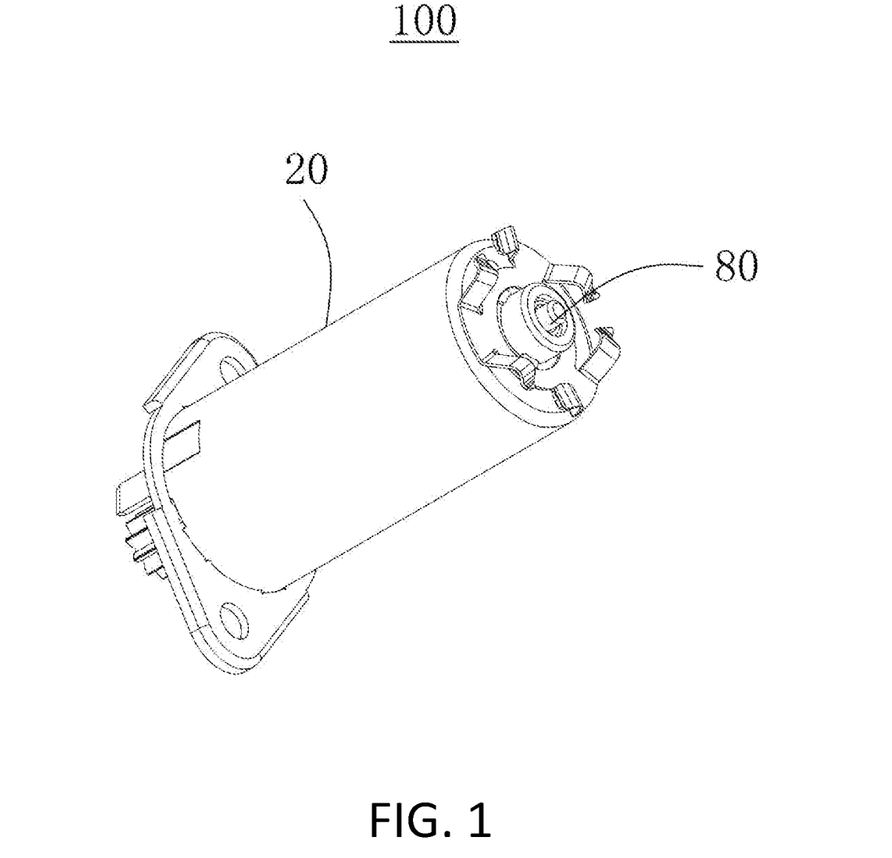
FIG. 1 illustrates a motor according to a preferred embodiment of the present disclosure.
Figure 2:
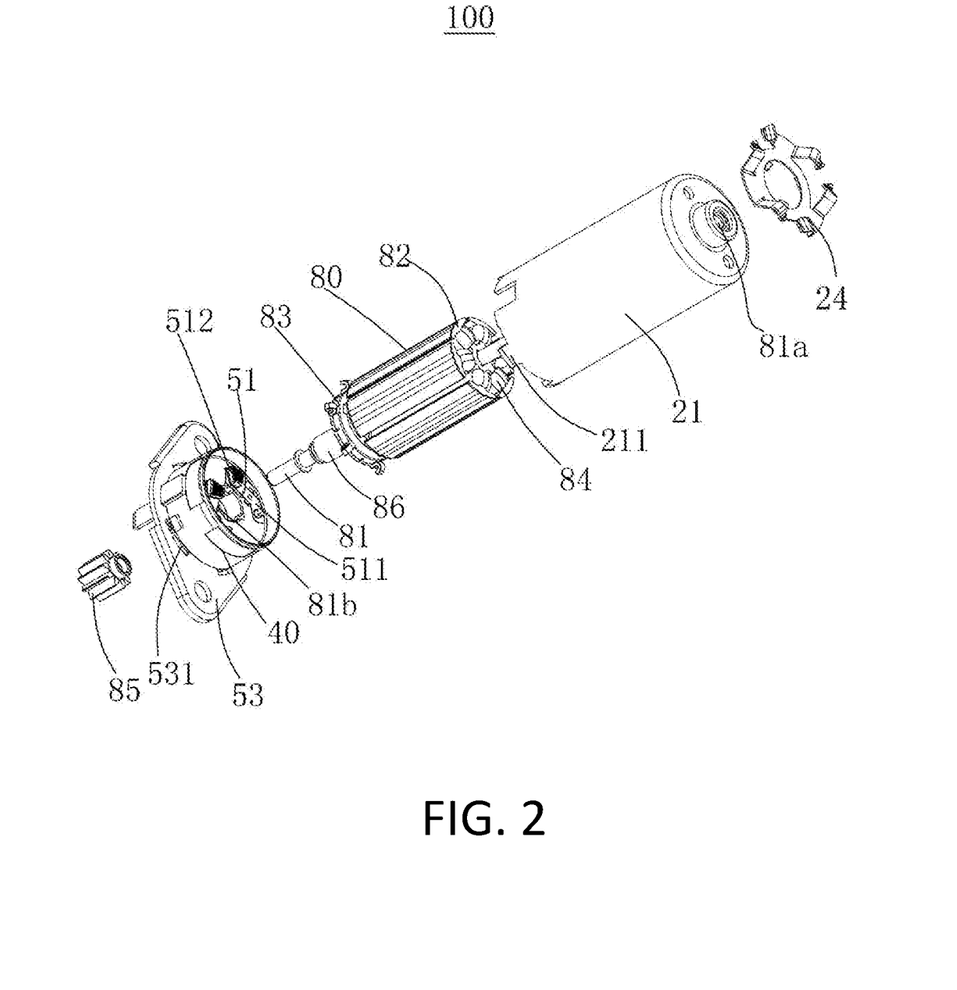
FIG. 2 is an exploded view of the motor of FIG. 1.

Referring to FIGS. 1 and 2, the motor 100 according to the present disclosure is preferably a brush motor, which includes a stator 20 and a rotor 80. The rotor 80 is arranged inside the stator 20 and is rotatable with respect to the stator 20. The motor 100 can be used in various applications, especially engine air management (EAM) systems, such as exhaust gas recirculation valves, electronic throttle valves, electronic waste gate valves, etc.

The stator 20 includes a cylindrical stator housing 21, at least one permanent magnet (not shown) mounted to an inner wall of the stator housing 21, an end cap 40 at least partially disposed inside an open end of the stator housing 21, and a metal cover 53 mounted to the open end of the stator housing 21. The stator 20 may further include a wave spring 24 attached to a bottom of the stator housing 21 which is opposite to the open end.

The rotor 80 includes a shaft 81, a rotor core 82 fixed to the shaft 81, a commutator 83, a rotor winding 84 wound on the rotor core 82 and connected with the segments of the commutator 83. The rotor core 82 and the commutator 83 are arranged in the stator housing 21. The commutator 83 is adjacent to the open end of the stator housing 21. The shaft 81 is supported by a bearing 81a located at the bottom of the stator housing 21 and a bearing 81b located at the metal cover 53, so that the rotor 80 is rotatable relative to the stator 20. In the other embodiment, the bearing 81b also can be arranged into the end cap 40. The shaft 81 passes through the end cap 40, with a small gear 85 fixed thereto for driving an external element. A sleeve 86 is sleeved on the shaft 81 and arranged between the bearing 81b and the commutator 83, for reinforcing the strength of the shaft 81 in the area and avoiding deformation due to vibration. Two ends of the sleeve 86 preferably directly or indirectly bear against the bearing 81b and the commutator 83, for limiting axial movement of the commutator 83. The material of the sleeve 86 is preferably but not limited to metal. For example, the sleeve 86 also can be made of insulating material.

Figure 3:
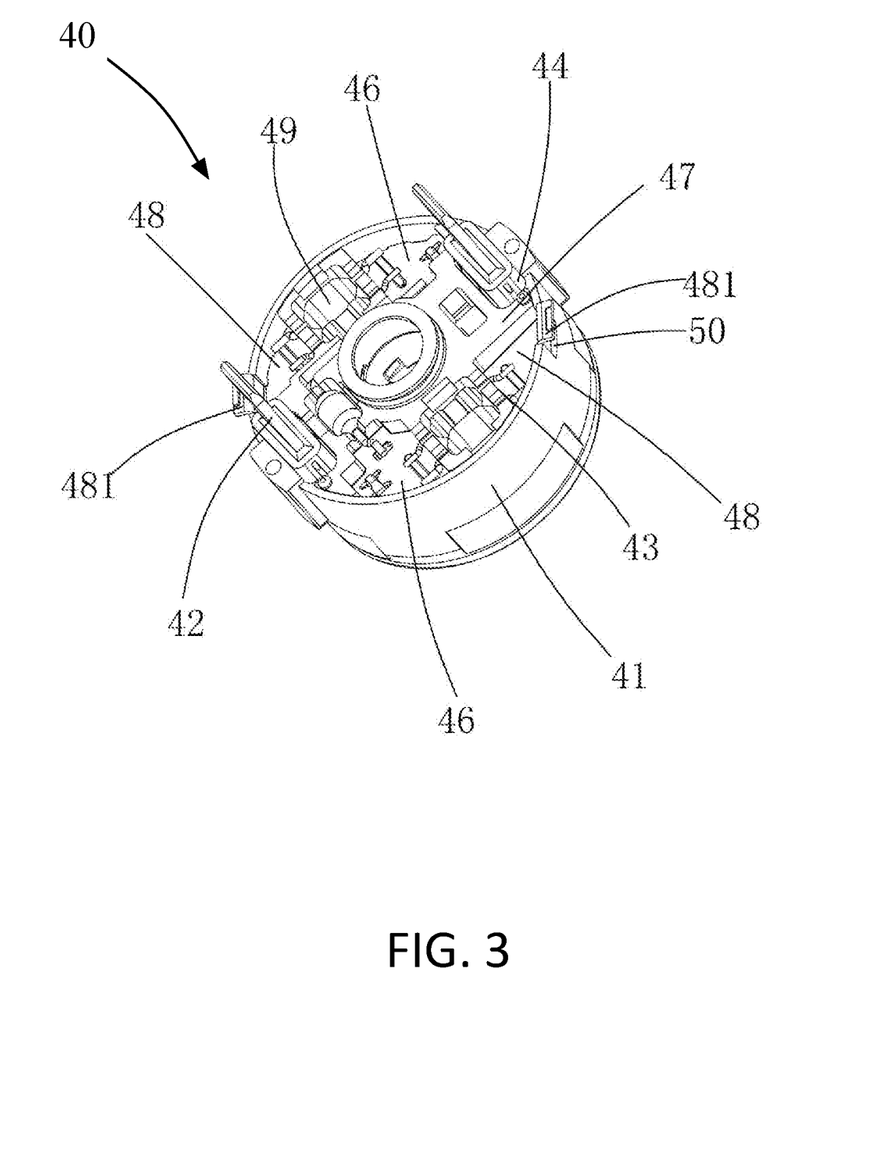
FIG. 3 illustrates an end cap of the motor of FIG. 1.

Referring to FIG. 3, the end cap 40 includes a substantially cylindrical insulating body 41, a pair of power terminals 42, and a filter circuit board 43. The power terminals 42 are configured for connecting the positive electrode and the negative electrode of an external power source. The insulating body 41 has a dividing wall 45 (FIG. 9) which divides the insulating body 41 into two parts in an axial direction of the motor. The first part of the insulating body 41 is adjacent to the metal cover 53 (FIG. 2), for accommodating the filter circuit board 43. The insulating body 41 further has two terminal mounting portions 44 extending in an axial direction of the rotor 80 (FIG. 2). The terminal mounting portions 44 are symmetrically arranged relative to the shaft 81. Each terminal mounting portion 44 has a mounting hole. The power terminals 42 are respectively inserted into the corresponding mounting holes. In other embodiments, the power terminal 42 also may be integrally formed with the insulating body 41.

Figure 4:
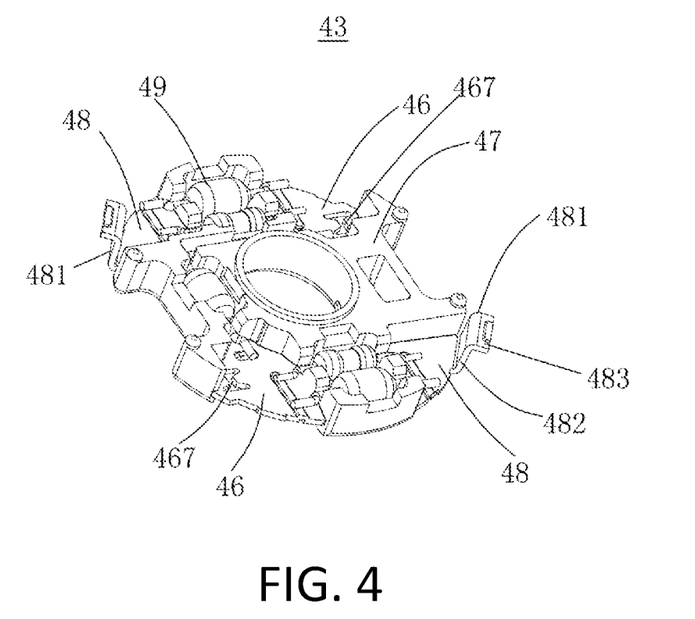
FIG. 4 illustrates a filter circuit board of the end cap of FIG. 3.
Figure 5:
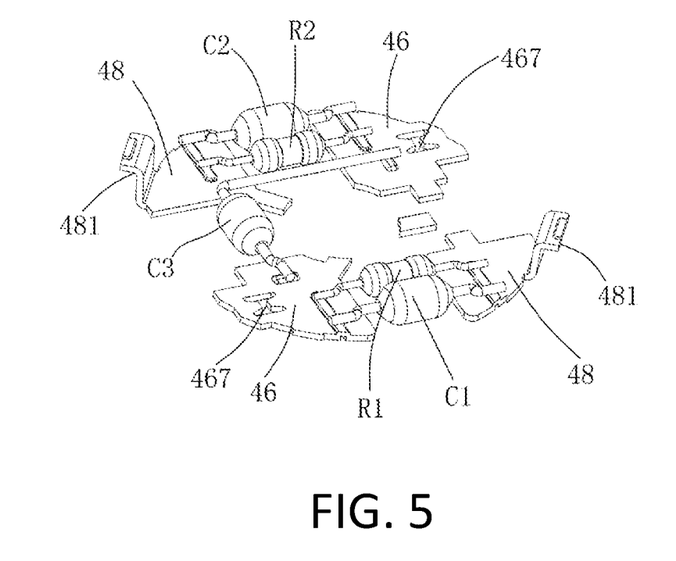
FIG. 5 illustrates the filter circuit board of FIG. 4, with an insulating support frame thereof removed.

Referring to FIGS. 4 and 5, the filter circuit board 43 is substantially in the shape of a flat plate, with a through hole to allow passage of the shaft 81 therethrough. The filter circuit board 43 includes an insulating support frame 47, a plurality of conductors partially embedded into the insulating support frame 47, and a plurality of filter elements 49. The insulating support frame 47 is substantially in the shape of a flat plate. The conductors include conductors 46 for connecting the external power source, and conductors 48 for grounding. The conductors 46, 48 are metal sheets substantially parallel to the filter circuit board 43. The insulating support frame 47 is integral with the plurality of conductors 46, 48 by injection molding. The filter elements 49 are connected, preferably spot welded, to the corresponding conductors 46 or conductors 48, as spot welding can be automated and has better connection performance. The insulating support frame 47 has a plurality of mounting grooves for mounting the filter elements 49.

Preferably, the composition of the insulating support frame 47 is a polyphenylene sulfite with 40% glass fiber added. The insulating support frame 47 of this material can withstand high temperature and high vibration.

The conductors 46 are respectively connected to the two power terminals 42. The conductors 48 have an extended grounding portion 481, which is connected to the stator housing 21 or the metal cover 53.

Figure 17:
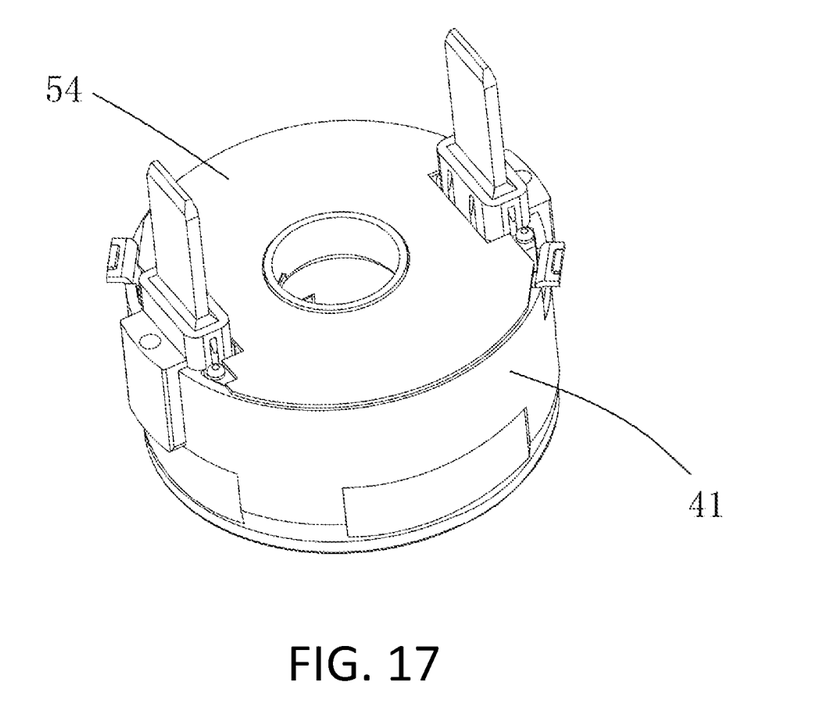
FIG. 17 illustrates the end cap of FIG. 3, assembled with an insulted sheet.

The two power terminals 42 respectively pass through the metal cover 53 to connect the external power source. An insulating sheet 54 shown in FIG. 17 is arranged between the filter circuit board 43 and the metal cover 53 for insulating them from one another. Preferably, the insulating support frame 47 and the insulating sheet 54 have engaging structures for positioning with each other, such as a protrusion and a hole. The metal cover 53 has positioning holes 531 for the positioning portions 211 of the stator housing 21 to pass through, so that the metal cover 53 and the stator housing 21 are assembled together.

In the embodiment, the conductors include two conductors 46 and two conductors 48. The two conductors 46 are arranged diagonally and the two conductors 48 are also arranged diagonally. Each of the conductors 46, 48 is partially embedded in the insulating support frame 47.

Figure 6:
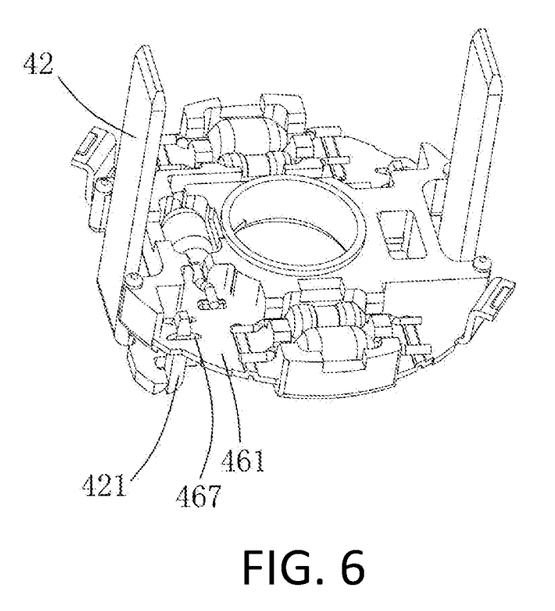
FIG. 6 illustrates an electrical connection between the filter circuit board and power terminals of the end cap of FIG. 3.

Each of the conductors 46 has an inserting hole 467. Each of the power terminals 42 has an inserting portion 421 extending along an axial direction of the motor, as shown in FIG. 6. Each inserting portion 421 is inserted into the corresponding inserting hole 467, to establish an electrical connection therebetween.

The grounding portion 481 of the conductor 48 has a first portion 482 substantially extending along the axial direction and a second portion 483 extending radially outward from the end of the first portion 482. The insulating body 41 has two openings 50, from which the second portions 483 of the two grounding portions 481 protrude. The second portions 483 are clamped between the metal cover 53 and the stator housing 21.

In an embodiment, the filter elements 49 include a first capacitor C1, a first resistor R1, a second capacitor C2, a second resistor R2, and a third capacitor C3. Two terminals of the first capacitor C1 are respectively connected, preferably spot welded, to one conductor 46 and one conductor 48. The first resistor R1 is adjacent to and connected in parallel with the first capacitor C1. Two terminals of the second resistor R2 are respectively connected, preferably spot welded, to the other conductor 46 and the other conductor 48. The second resistor R2 is adjacent to and connected in parallel with the second capacitor C2. Two terminals of the third capacitor C3 are respectively connected, preferably spot welded, to the two conductors 46.

In an alternative embodiment, the filter circuit board may have more filter elements 49 or have only one filter element 49 which is a capacitor or a resistor. In the alternative embodiment, the filter circuit board may have only one grounding conductor 48, or the two conductors 48 may be an integral conductor. In the alternative embodiment, the filter circuit board may not have the conductors 48, and the terminals of the filter elements 49 can be grounded by directly contacting the stator housing 20 or the metal cover 53.

Figure 7:
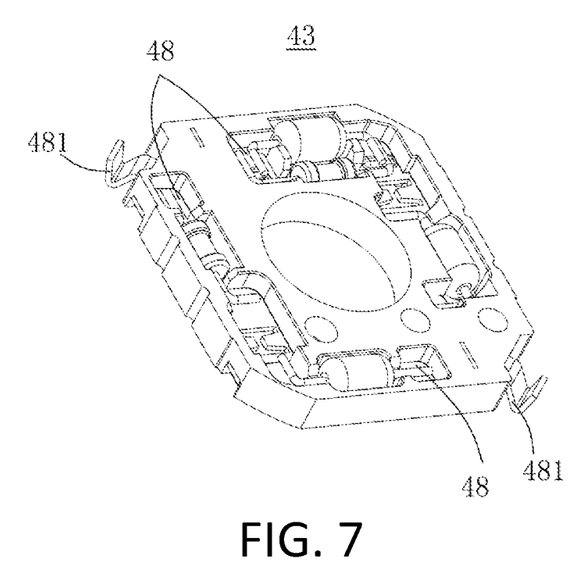
FIG. 7 illustrates a filter circuit board of the end cap of FIG. 3 according to another embodiment of the present disclosure.

FIG. 7 illustrates a filter circuit board according to another embodiment of the present disclosure. In this embodiment, the grounding portions 481 of the two conductors 48 respectively contact the inner wall of the stator housing 21, to establish an electrical connection therebetween. Preferably, the grounding portion 481 is an elastic piece that abuts against the stator housing 21, such as an elastic piece inclined to the axial direction, or a V-shaped elastic piece.

Figure 8:
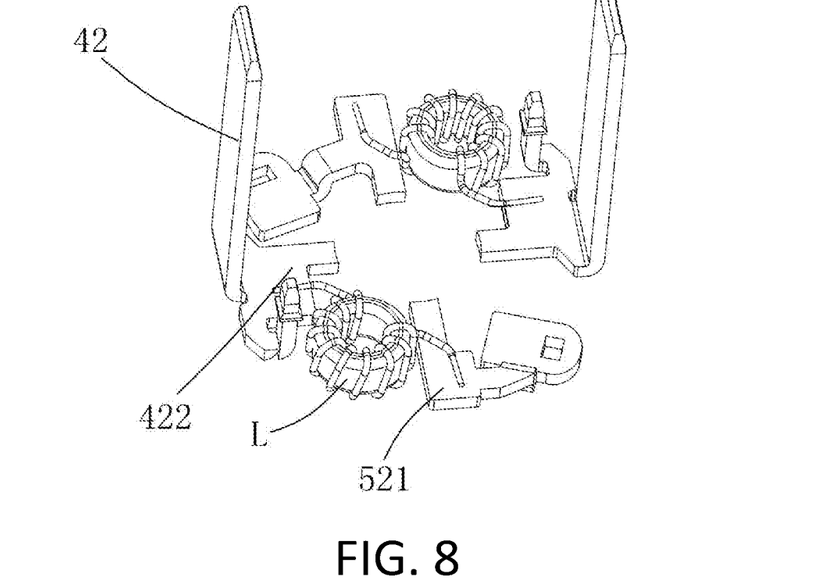
FIG. 8 illustrates an electrical connection between the power terminals and inductors of the end cap of FIG. 3.
Figure 9:
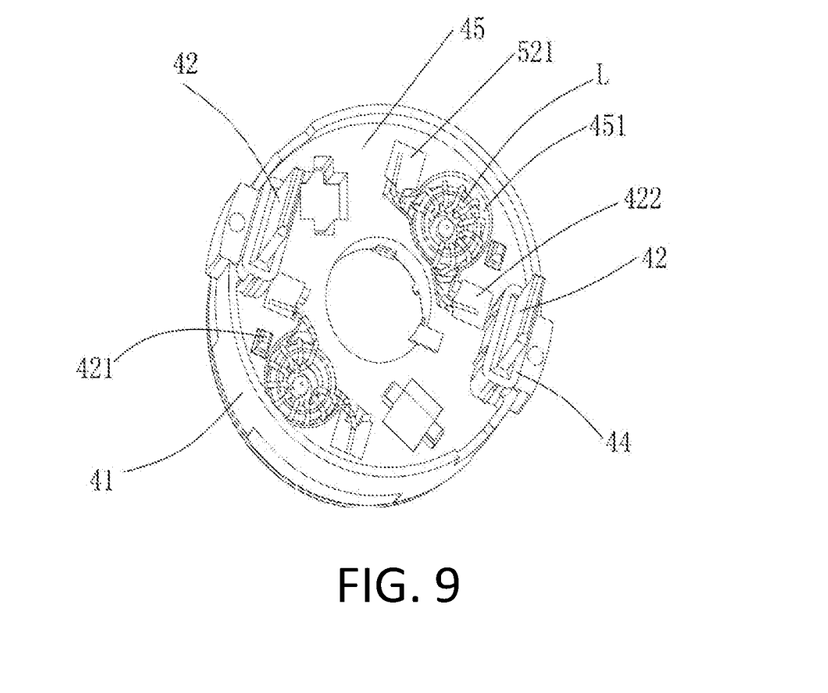
FIG. 9 illustrates the end cap of FIG. 3, with the filter circuit board removed.

Referring to FIGS. 2, 8 and 9, the insulating body 41 further includes two conductive terminals 521 which are mounted to or integral with the insulating body 41. In the illustrated embodiment, the conductive terminal 521 substantially extends along a direction parallel to the filter circuit board. A brush assembly 51 is mounted to the second part of the insulating body 41. In the illustrated embodiment, the brush assembly 51 includes two elastic arms 511 and two corresponding brushes 512. One end of the elastic arm 511 is mounted on the dividing wall 45, the other end of the elastic arm 511 is a free end mounted with a brush 512. The elastic arm 511 is connected, preferably spot welded, to the corresponding conductive terminal 521. In an alternative embodiment, the brush assembly also may include brushes, and brush cases for accommodating the brushes.

Two recesses 451 are formed in one surface of the dividing wall 45 adjacent to the filter circuit board 43, for arranging inductors L. Each inductor L is preferably but not limited to ring-shaped, or can be other-shaped, such as strip-shaped. In other embodiments, the recesses 451 also may be formed in the second part of the insulating body 51, whereby the inductors L and the brush assembly 51 are arranged at the same side of the insulating body 51. In such an embodiment, the inductor L is preferably strip-shaped. Each inductor L may be fixed in the recess 451 by an adhesive, such as glue. In the illustrated embodiment, the number of the inductors L is two. Each inductor L is connected between the corresponding power terminal 42 and brush assembly 51. Specifically, each power terminal 42 has a connection portion 422. In the embodiment, the connection portion 422 substantially extends along the direction parallel to the filter circuit board. One end of the inductor L is connected, preferably spot welded, to the corresponding connection portion 422, to establish an electrical connection therebetween. The other end of the inductor L is connected, preferably spot welded, to the corresponding conductive terminal 521, to establish an electrical therebetween. A predetermined axial distance is formed between the inductors L and the filter circuit board 43, to avoid an electrical conduction.

Figure 10:
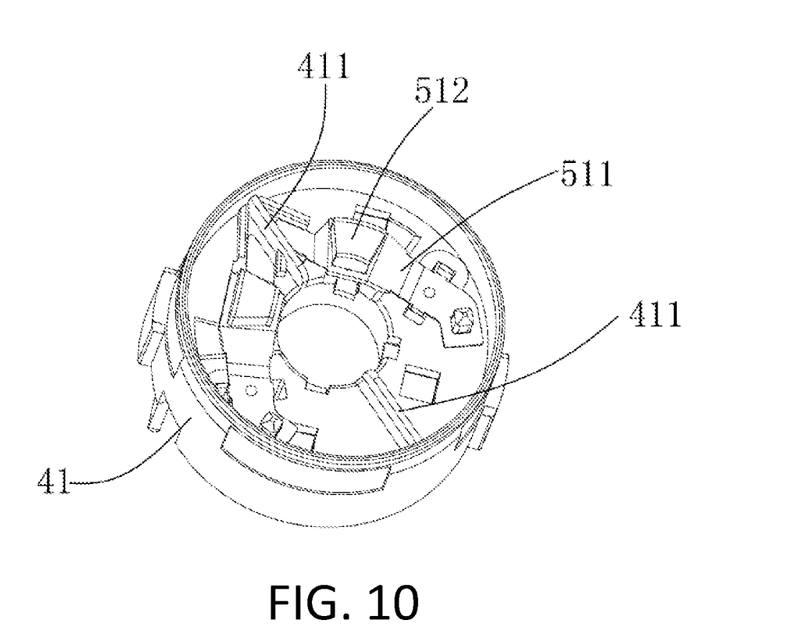
FIG. 10 illustrates the other side of the end cap of FIG. 3.

Referring to FIG. 10, the second part of the insulating body 41 further includes at least one isolation rib 411 extending along a radial direction of the motor and arranged between the two brushes 512. The isolation rib 411 may be formed on the surface of the dividing wall 45. In the embodiment, the two elastic arms 511 are symmetrically distributed with respect to the rotating shaft 81, and are splayed. There are two isolation ribs 411 disposed between the two elastic arms 511. A line connecting the two isolation ribs 411 passes through the center of the shaft 81. When the rotor rotates, the segments of the commutator 83 are in sliding contact with the brushes 512, and thus the brushes 512 wear out continuously and produce dust. The isolation rib 411 is configured for avoiding a short circuit of the brushes 512 caused by the dust.

Figure 11:
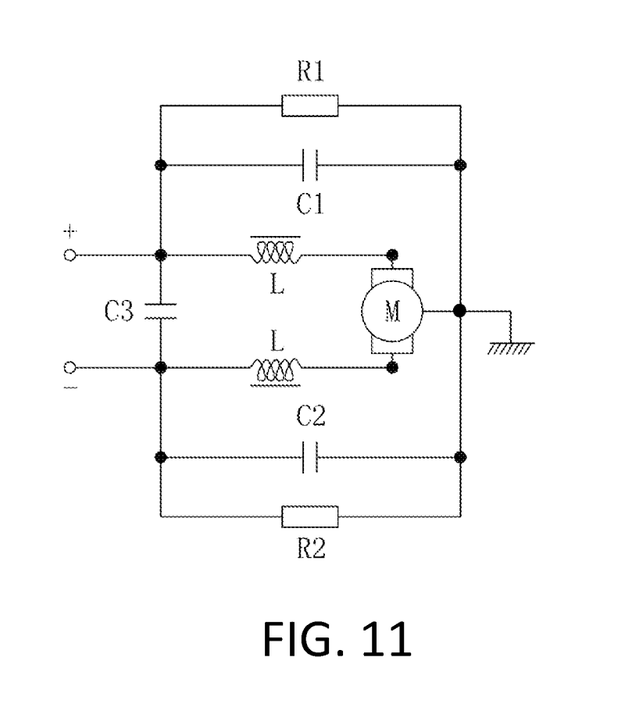
FIG. 11 is a circuit diagram of the motor of FIG. 1.

FIG. 11 is a circuit diagram of the motor 100, wherein M represents the motor 100. The two power terminals 42 are connected to the external power source. The first capacitor C1 is connected between the positive electrode of the power source and the ground. The first resistor R1 is connected in parallel with the first capacitor C1. The second capacitor C2 is connected between the negative electrode of the power source and the ground. The second resistor R2 is connected in parallel with the second capacitor C2. The two inductors L are respectively connected between the corresponding electrode of the power supply and the corresponding brush 512. The third capacitor C3 is connected between the positive electrode and the negative electrode of the power supply.

Figure 12:
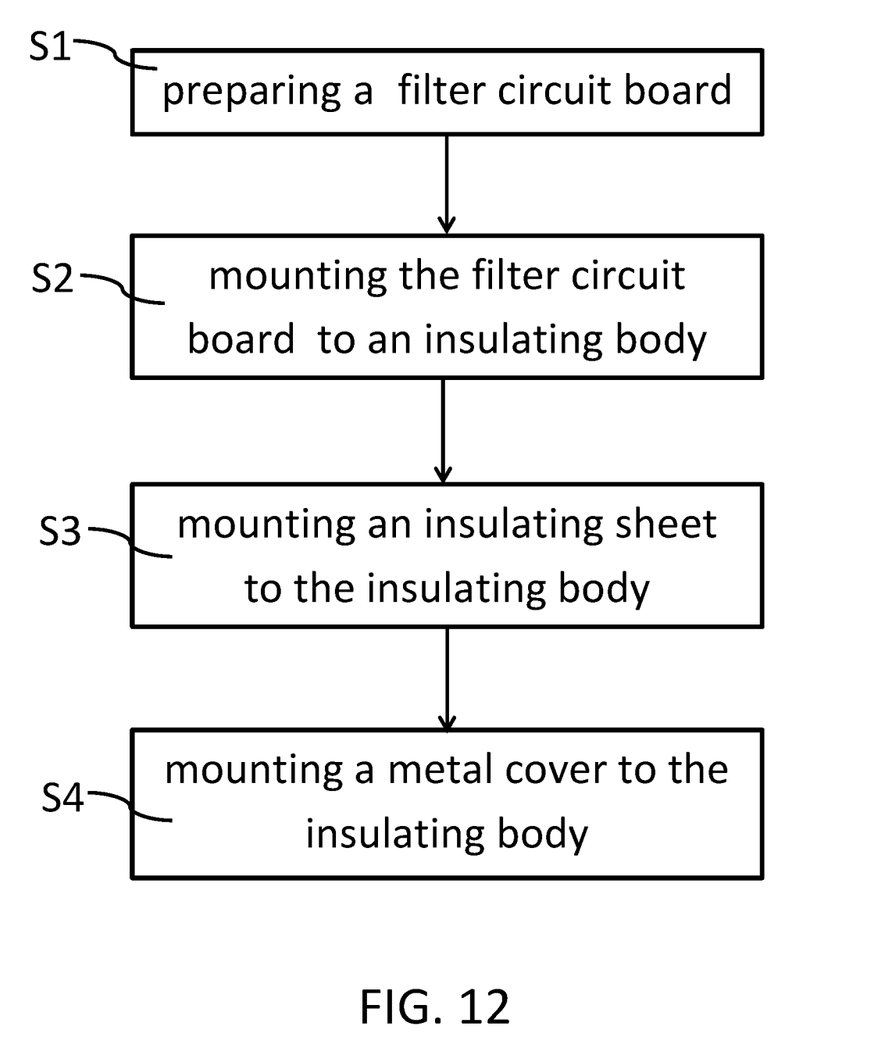
FIG. 12 is a flowchart of a manufacturing method of the end cap of FIG. 3 according to a preferred embodiment of the present disclosure.
Figure 13:
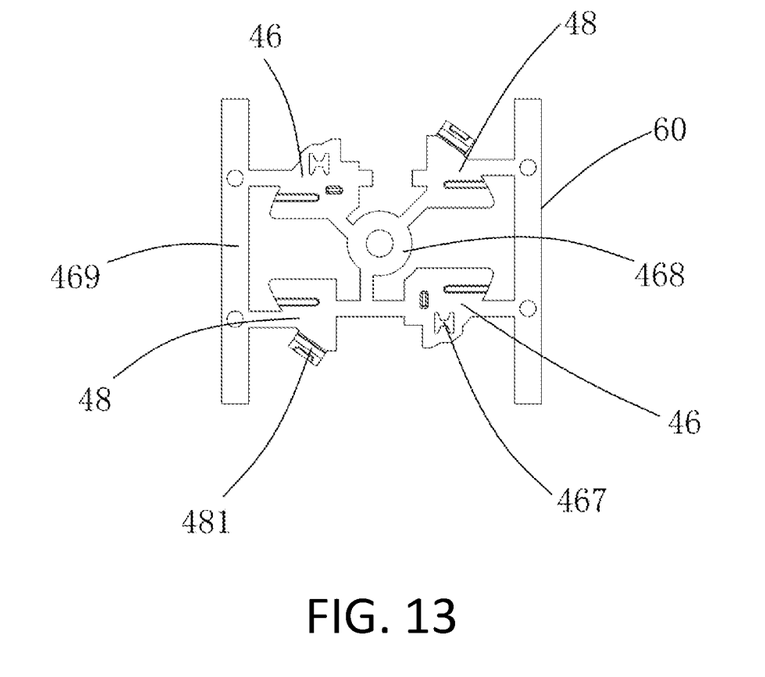
FIGS. 13 to 16 illustrate the manufacturing process of the filter circuit board of FIG. 4.

Referring to FIG. 12, a manufacturing method of the end cap 40 of the motor is provided according to a preferred embodiment of the present disclosure, which includes the follow steps:

S1, preparing a filter circuit board 43, which includes the following steps:

A1, as shown in FIG. 13, forming conductors.

In the embodiment, the step A1 is forming an integral conductor frame 60 having two conductors 46 and two conductor 48. The conductor frame may be formed by stamping a metal sheet, such as a copper sheet. The conductors 46, 48 are integral due to the presence of the scraps 468, 469. The scrap 468 may be located inside conductors 46, 48, and the scrap 469 may be located outside of the conductors 46, 48. In an alternative embodiment, the conductors 46 may not be formed.

Figure 14:
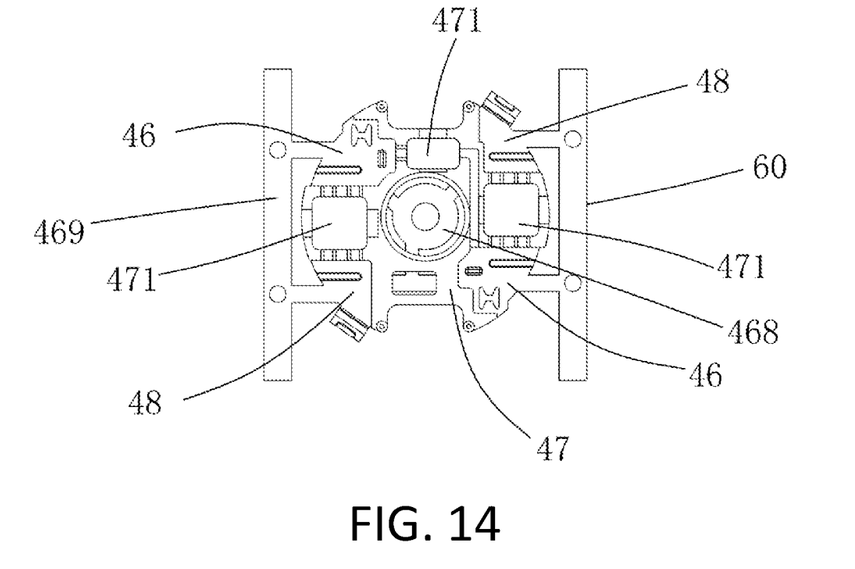

A2, as shown in FIG. 14, molding an insulating support frame 47 on the conductors or the conductor frame 60, and each conductor is partially embedded in the insulating support frame 47.

Preferably, the two conductors 46 are arranged diagonally and the two conductors 48 are also arranged diagonally. The scraps 468, 469 are exposed outside of the insulating support frame 47. The insulating support frame 47 has a plurality of mounting grooves 471 for mounting filter elements 49, such as capacitors or resistors.

Figure 15:
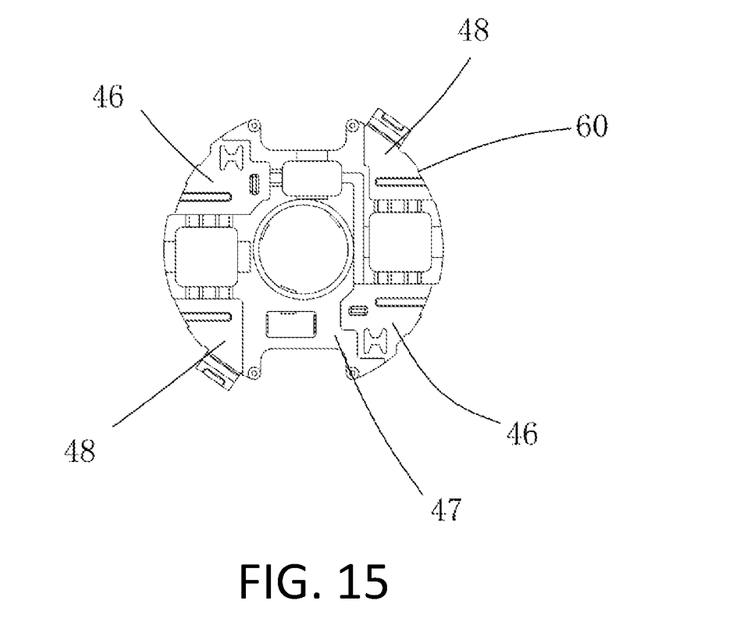

A3, as shown in FIG. 15, removing the scraps 468 and 469 from the conductor frame 60.

Figure 16:
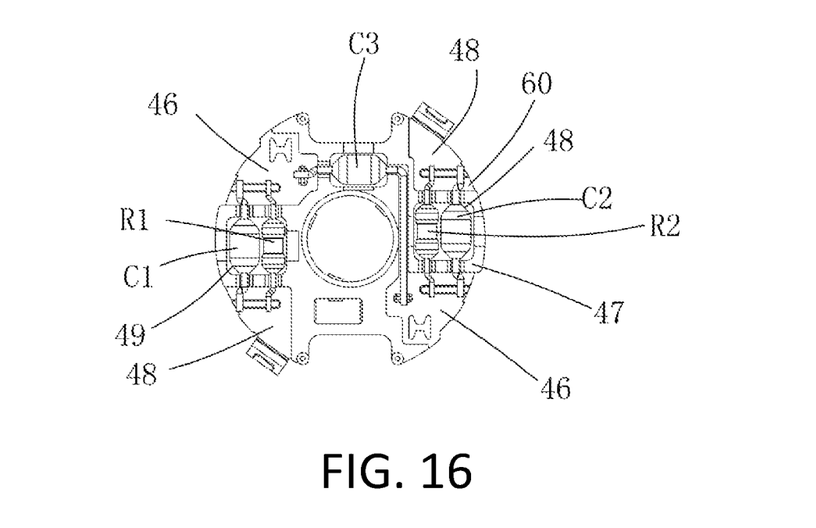

A4, as shown in FIG. 16, connecting the filter elements 49 to the corresponding conductors 46, 48.

In the embodiment, the filter elements 49 include a first capacitor C1, a first resistor R1, a second capacitor C2, a second resistor R2, and a third capacitor C3. The filter elements 49 are respectively mounted to the corresponding mounting grooves 471 of the insulating support frame 47. The first capacitor C1 and the first resistor R1 are adjacent. The second capacitor C2 and the second resistor R2 are adjacent one another.

S2, mounting the filter circuit board 43 to an insulating body 41.

The insulating body 41 may be formed by injection molding. The step S2 may further comprises respectively connecting the conductors 46 to two power terminals 42 which may be integrally formed with the insulating body 41 or installed to the insulating body 41. In the embodiment, each power terminal 42 has an inserting portion 421. Each conductor 46 has an inserting hole 467 for clamping the inserting portion 421. The insulating body 41 is assembled with a brush assembly 41. The brush assembly 51 may have two elastic arms 511 and two brushes 512.

S3, as shown in FIG. 17, mounting an insulating sheet 54 to the insulating body 41, for covering the filter circuit board 43.

S4, mounting a metal cover 53 to the insulating body 41, wherein the power terminals 42 pass through the metal cover 53 to connect an external power source.

The above described insulating body 41 may be further assembled with two inductors L. The inductors L are respectively connected between the corresponding power terminals 42 and elastic arms 511 of the brush assembly 41.

The end cap of the present disclosure has a filter circuit board which is directly mounted to the end cap or inside the motor. The filter circuit board includes an integrally formed insulating support frame and a plurality of conductors, and a plurality of filter elements respectively connected between corresponding conductors. The mounting process of the end cap is simple, convenient for automatic assembly, and thus has low cost.

It should be noted that, the brush motor also may be a brushless motor without the above described end cap. The filter circuit board mounted into the motor of the present disclosure also may be supported by a metal cover of a brush motor or a brushless motor, or any supporting structure of a brush motor or a brushless motor, such as a bearing fixing structure for fixing two bearings of a brushless motor.

The above descriptions are only preferred embodiments of the present disclosure, and are not to limit the present disclosure. Any changes, equivalents, modifications and the like, which are made within the spirit and principle of the present disclosure, shall fall within the protection scope of the present disclosure.

The invention claimed is:

1. An end cap of an electric motor, comprising an insulating body, wherein the end cap further comprises a filter circuit board mounted to the insulating body, the filter circuit board comprising:
   two power conductors, for receiving an external power source,
   an insulating support frame integral with the at least two power conductors, and
   at least one filter element, one end of the at least one filter element being connected to a corresponding power conductor, the other end of the at least one filter element being grounded,
   wherein the insulating body is substantially cylindrical which has a dividing wall which divides the insulating body into two parts in an axial direction of the end cap, the filter circuit board and a brush assembly are respectively accommodated in the two parts of the insulating body.

2. The end cap according to claim 1, wherein the filter circuit board further comprises at least one grounding conductor configured to be grounded, and the at least one filter element is grounded by connecting the at least one grounding conductor.

3. The end cap according to claim 1, wherein the filter circuit board is substantially in the shape of a flat plate, the two power conductors are metal sheets substantially parallel to the filter circuit board.

4. The end cap according to claim 1, wherein the insulating support frame comprises at least one mounting groove for mounting the at least one filter element.

5. The end cap according to claim 1, further comprising a pair of power terminals fixed by the insulating body, for connection the external power source.

6. The end cap according to claim 1, wherein each power conductor has an in inserting hole, and each power terminal has an inserting portion being inserted into a corresponding inserting hole.

7. The end cap according to claim 1, wherein the dividing wall has at least one recess, for arranging at least one inductor.

8. The end cap according to claim 1, wherein the brush assembly comprises at least two brushes, and the insulating body further comprises at least one isolation rib extending along a radial direction of the end cap and arranged between the two brushes.

9. An electric motor, comprising a rotor and a stator, wherein the stator comprises a filter circuit board mounted into the electric motor, the filter circuit board comprising:
   two power conductors, for receiving an external power source,
   an insulating support frame integral with the at least two power conductors, and
   at least one filter element, one end of the at least one filter element being connected to a corresponding power conductor, the other end of the at least one filter element being grounded,
   wherein the stator comprises a housing with an open end, an end cap with a brush assembly, the end cap is at least partially disposed inside the open end of the housing, and the filter circuit board is supported by the end cap, wherein the end cap is substantially cylindrical which has a dividing wall which divides the end cap into two parts in an axial direction, the filter circuit board and the brush assembly are respectively accommodated in the two parts of the end cap.

10. The electric motor according to claim 9, wherein the filter circuit board further comprises at least one grounding conductor configured to be grounded, and the at least one filter element is grounded by connecting the at least one grounding conductor.

11. The electric motor according to claim 9, wherein the filter circuit board is substantially in the shape of a flat plate, the two power conductors are metal sheets substantially parallel to the filter circuit board.

12. The electric motor according to claim 9, wherein the stator comprises a housing with an open end, a metal cover is mounted to the open end of the housing, and the filter circuit board is supported by the metal cover.

13. A manufacturing method of an end cap of an electric motor, comprising:
   preparing a filter circuit board, comprising:
      forming two power conductors for receiving an external power source;
      molding an insulating support frame on the two power conductors; and
      connecting at least one filter element to a corresponding power conductor; and
   mounting the filter circuit board to an insulating body,
   wherein the insulating body is substantially cylindrical which has a dividing wall which divides the insulating body into two parts in an axial direction of the end cap, the filter circuit board and a brush assembly are respectively accommodated in the two parts of the insulating body.

14. The manufacturing method according to claim 13, wherein the step of forming conductors comprises forming an integral conductor frame having two power conductors.

15. The manufacturing method according to claim 13, wherein the step of mounting the filter circuit board to an insulating body further comprises respectively connecting the power conductors to two power terminals fixed by the insulating body.

16. The manufacturing method according to claim 13, further comprising mounting an insulating sheet to the insulating body for covering the filter circuit board; and
mounting a metal cover to the insulating body.

* * * * *